Feb. 11, 1964     T. W. KENNEDY     3,120,923
CIRCULAR SLIDE RULE
Filed Oct. 25, 1960
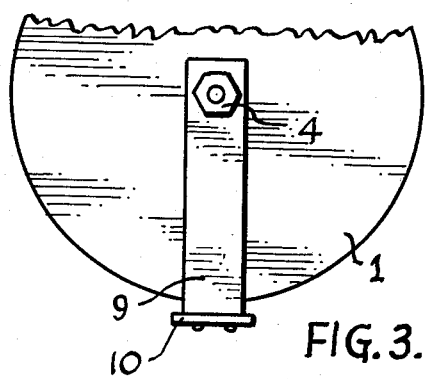
FIG. 3.
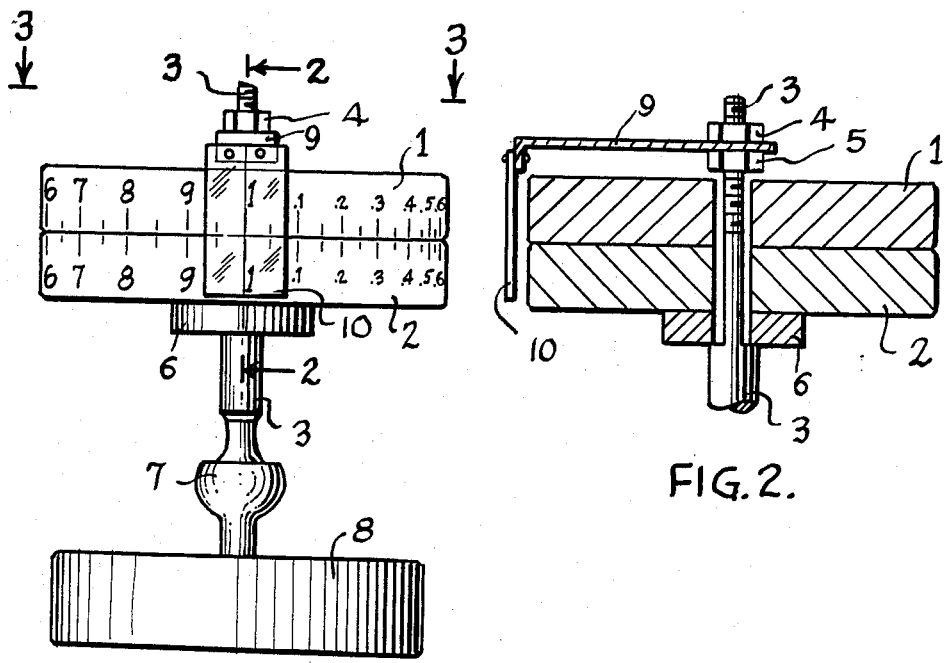
FIG. 2.
FIG. 1.
INVENTOR.
Thomas W. Kennedy United States Patent Office 3,120,923
Patented Feb. 11, 1964

3,120,923
CIRCULAR SLIDE RULE
Thomas W. Kennedy, New York, N.Y.
(134 Wildwood Ave., Montclair, N.J.)
Filed Oct. 25, 1960, Ser. No. 64,906
3 Claims. (Cl. 235—84)

This invention relates to slide rules and more particularly to slide rules circular in shape combining two or more wheels, having the scales on the circumferential surfaces of the wheels.

Slide rules have heretofore been made with one rule member relatively stationary and the other member as a slide portion; and both members rectangular in shape. The scales have been arranged to read from the left end to the right end of the rule. A sliding cursor, with crosshair, has been provided. The operation of the above slide rule has required the use of both hands. In addition, it has required a considerable degree of finger dexterity for accurate operation. Furthermore, it has been necessary to discontinue operating the slide rule in order to record each result, because the operation of the rule requires the use of both hands.

Therefore, an object of the present invention is to operate the slide rule by the use of one hand, so that the other hand is free to record each result.

Another object is to arrange the scales on the circumferential surface of the wheels, so that the scales are continuous. The end of each scale is followed by the beginning of the same scale. Both wheels or scale members are rotatable about the same axis, and the cursor is a fixed member.

A further object is to reduce the extent of manual dexterity necessary to operate the slide rule, as too much concentration on the operation of the slide rule members will lessen the concentration on the mathematical problem in mind.

Still another object is to avoid pushing on the sharp ends of the slide rule members, and instead, use sensitive and accurate finger friction to move the members.

The invention further seeks a device having large readable scales but still being compact in shape, which can be either carried in a pocket, or mounted on a desk; and which can be operated by one hand under any condition of use.

The invention also seeks a slide rule with the scales arranged at about a right angle to the operator's line of vision when desk-mounted.

A further object of the invention is to permit easy cleaning and adjusting of the moving parts. Due to changes in humidity and temperature and due to dust accumulation on the parts, it is necessary to clean the parts and adjust the sliding resistance and friction.

It is also sought to use component parts which are shaped to prevent warping and buckling.

It is also an object that the device be self-supporting.

Another object is to have an economical manufacturing cost by using simplified contact surfaces, and by using parts which are easily fitted together, and by using adjustable securing means.

Another object is to provide a fixed cursor so that a reading can be always made at the same place.

The invention will be understood from the following description when considered in connection with the accompanying drawing forming a part thereof, and in which:

FIG. 1 is an elevation view of the slide rule.
FIG. 2 is a sectional view taken on line 2—2 of FIG. 1.
FIG. 3 is a top plan view taken on line 3—3 of FIG. 1.
Like characters of reference refer to like parts throughout the several views.

Referring to the drawings, two wheels, an upper wheel 1 and a lower wheel 2 are mounted on a shaft 3. The wheels 1 and 2 are made of metal or plastic material. The shaft 3 passes through a hole in each wheel, at the axis of the wheels 1 and 2. The holes are of slightly larger inside diameter than the outside diameter of the shaft 3, so that the wheels 1 and 2 can rotate together, and rotate easily about the shaft 3 centerline.

The lower wheel 2 rests on a washer 6, which in turn rests on a shoulder on the shaft 3.

Logarithmic scales, or similar scales for mathematical operations, are arranged on the circumferential surfaces of wheels 1 and 2. The circumferential surface may also be called the exterior edge.

The lower end of the shaft 3 is connected to a universal joint 7, which is mounted on a base plate 8. The universal joint 7 permits varying the angle of the shaft 3, relative to the base plate 8, so that the plane of the wheels 1 and 2 and the scales thereon can be moved to suit the line of vision of the operator.

The upper end of the shaft 3 is threaded to take two nuts 4 and 5. The nut 5 prevents the wheels 1 and 2 from rising upward and off the shaft 3.

A fixed cursor 10 having a crosshair is supported by a bracket plate 9. The plate 9 is cantilevered from the shaft 3 and is connected to the shaft 3 by the nuts 4 and 5. The cursor 10 is made of glass or transparent plastic material. The bracket plate 9 is made of metal or plastic material. The cursor 10 and bracket plate 9 can be removed from the shaft 3 by unscrewing the upper nut 4.

While the logarithm scales, usually termed A and B scales, are only shown in the drawing, it is intended that othe scales may be added, such as the trigonometric scales: sine, cosine and tangent, and like scales for mathematical computations. The drawing also shows the logarithm scales as continuous scales. However, scales for special computations, particularly where such special scales are related to the logarithm and trigonometric scales, need not be continuous.

The scales are moved relative to each other by rotating the respective wheels 1 and 2. The scales can be kept aligned, and then rotated simultaneously, by rotating both wheels 1 and 2 simultaneously.

As for operating the embodiment shown; as a first operation: both wheels 1 and 2 can be rotated in the same angular direction at the same angular speed by turning the upper wheel 1 using one finger. As a second operation: the upper wheel 1 can be held fixed, and the lower wheel 2 rotated. As a third operation, the upper wheel 1 can be rotated clockwise, while the lower wheel 2 is rotated counterclockwise. The above second and third operations can be done by using two fingers of one hand, that is, placing the index finger on the upper surface of the upper wheel 1 and placing the thumb on the lower surface of the lower wheel 2.

To operate the slide rule itself, one places the index or pointer finger of either hand on the upper surface of the upper wheel 1, and places the thumb of the same hand on the lower surface of the lower wheel 2, so that both wheels 1 and 2 can be rotated simultaneously, or one wheel 1 can be rotated relative to the other wheel 2.

These operations occur in this way because of the type of and extent of friction between the moving parts. The total frictional resistance to rotation of one wheel 1 relative to the other wheel 2 is determined by the friction between the contact surfaces of wheels 1 and 2. The total resistance to rotation of both wheels 1 and 2 is set and determined by the friction between the contact surfaces of the lower wheel 2 and the washer 6.

The total frictional resistance of rotating both wheels 1 and 2 simultaneously is less than when the wheel 1 is rotated relative to wheel 2.

In general, the device can be operated when upsidedown, or when the shaft 3 is positioned at any angle. There is one exception to this, which occurs when the shaft 3 is positioned in a perfectly horizontal position. Under this exceptional condition, there is no friction between the contact surfaces of wheels 1 and 2 and no friction between the contact surface of wheel 2 and washer 6. To make the device operate under this exceptional condition it would be necessary to add the following:

(a) Fixedly connect washer 6 to shaft 3.

(b) Add a coating of material, such as rubber, which has a high friction coefficient to the surface of washer 6 which is in contact with wheel 2.

(c) Use metal as the material of wheels 1 and 2, and magnetize wheels 1 and 2, so that they are attracted together, thus causing wheel 2 to turn simultaneously when wheel 1 is turned.

By adding items a, b and c to the device shown in the drawings, the slide rule will operate under the exceptional condition mentioned above.

To operate the slide rule under this exceptional condition, one grips wheel 1 with the fingers of the left hand, placing the fingers on the circumferential surface of wheel 1.

In order to rotate both wheels 1 and 2 simultaneously, one withdraws wheel 1 away from washer 6. Due to the magnetic attraction of wheel 1 and 2, wheel 2 will also withdraw from washer 6. Wheel 1 is then rotated and wheel 2 will rotate at the same angular speed as wheel 1. This is the double-wheel locking means used.

In order to fix wheel 2 and rotate wheel 1, one pushes wheel 1 toward washer 6 and maintains a slight pressure transversely toward washer 6. Wheel 2 is then forced aaginst washer 6 by wheel 1. Wheel 2 will be held in a fixed position, due to the coating on washer 6, while wheel 1 is rotated relative to wheel 2. This is the single-wheel locking means used.

In the embodiment shown in the drawings, when used in all positions, except when the shaft is in a perfectly horizontal position, there is no need to add items a, b and c mentioned above. Wheels 1 and 2 will rotate simultaneously when wheel 1 alone is rotated by the index finger. The friction between wheel 1 and 2 is greater than the friction between wheel 2 and the washer 6. This is the double-wheel locking means of the embodiment.

When wheel 1 is rotated relative to wheel 2 and it is desired to lock wheel 2, the thumb is placed on the underside of wheel 2. The friction of the thumb on the surface of the underside of wheel 2 locks wheel 2, while the index finger rotates wheel 1. This is the single-wheel locking means of the embodiment.

While a plain washer 6 is shown in the drawing, it may be more efficient to use a thrust-type, ball-bearing race in place of a plain washer.

Since changes may be effected in the form of the invention selected for disclosure and in the method steps without departing from the principles thereof, it will be understood that the invention is not to be limited excepting by the scope of the appended claims.

What is claimed is:

1. A one-hand operated circular slide rule comprising a shaft, a pair of wheels journaled on said shaft, the upper wheel of said pair capable of being manually actuated and the lower wheel capable of being actuated by the upper wheel; said shaft having a shoulder portion with a surface frictonally engaging a lower face of said lower wheel; magnetic means holding said upper wheel and lower wheel in frictional engagement so that said upper wheel when actuated can raise said lower wheel out of engagement with said shoulder portion and rotate said lower wheel; and wherein the frictional drag between said shoulder portion and said lower wheel is greater than the frictional drag between said upper wheel and said lower wheel when said lower wheel is urged against said shoulder portion by said upper wheel.

2. A one-hand operated circular slide rule as claimed in claim 1 and in which said wheels are composed of ferrous material and are magnetized.

3. A one-hand operated circular slide rule as claimed in claim 1 and in which one end of said shaft is connected to a base by a universal joint connection.

References Cited in the file of this patent

UNITED STATES PATENTS

| | | |
|---|---|---|
| 657,916 | Conant | Sept. 18, 1900 |
| 710,288 | Manly | Sept. 30, 1902 |
| 1,255,939 | Small | Feb. 12, 1918 |
| 1,447,309 | Johnson | Mar. 6, 1923 |
| 1,605,703 | Brown | Nov. 2, 1926 |
| 2,034,027 | Decary et al. | Mar. 17, 1936 |
| 2,177,176 | Gilmore | Oct. 24, 1939 |
| 2,338,703 | Chapman | Jan. 11, 1944 |
| 2,418,933 | Hill | Apr. 15, 1947 |
| 3,023,955 | Bailey | Mar. 6, 1962 |

FOREIGN PATENTS

| | | |
|---|---|---|
| 677,453 | Great Britain | Aug. 13, 1952 |